United States Patent [19]

Alley

[11] Patent Number: 5,791,719
[45] Date of Patent: Aug. 11, 1998

[54] VEHICLE DEFLECTOR MOUNTING SYSTEM

[75] Inventor: Robert J. Alley, Elkhart, Ind.

[73] Assignee: Plastic Form, Inc., Elkhart, Ind.

[21] Appl. No.: 646,179

[22] Filed: May 7, 1996

[51] Int. Cl.$^6$ ..................................................... B60J 1/20
[52] U.S. Cl. ................................................ 296/91; 24/295
[58] Field of Search ........................... 296/91, 180.1; 24/292, 293, 295, 532

[56] References Cited

U.S. PATENT DOCUMENTS

| D. 300,918 | 5/1989 | Turner | D12/190 |
|---|---|---|---|
| 4,153,129 | 5/1979 | Redmond | 180/68.6 |
| 4,296,530 | 10/1981 | Muller et al. | 24/295 |
| 4,518,191 | 5/1985 | Williams et al. | 296/91 |
| 4,846,522 | 7/1989 | Bonstead et al. | 296/91 |
| 5,067,206 | 11/1991 | Metcalfe | 24/290 |
| 5,094,497 | 3/1992 | Hartung et al. | 296/91 |
| 5,347,690 | 9/1994 | Mansoor et al. | 24/295 |
| 5,348,363 | 9/1994 | Fink | 296/91 |
| 5,403,059 | 4/1995 | Turner | 296/91 |

OTHER PUBLICATIONS

Deflecta–Shield Corporation, "Aerosport No–Drill Installation" for Bug Shield; May 15, 1995.
DeFlecta–Shield Corporation 1996 Product Catalog #00–9601–CC; Copyright 1995.

Primary Examiner—Andrew C. Pike
Attorney, Agent, or Firm—Edgar A. Zarins; Malcolm L. Sutherland

[57] ABSTRACT

A system for mounting a front hood deflector to a vehicle does not require drilling of the hood to install fasteners. The molded plastic deflector body is retained on the hood by at least one mounting clip which adheres to the hood and includes biasing properties for maintaining solid contact against the vehicle body. The biasing clip also acts on the shield body to frictionally engage the shield retarding removal of the body from the clip. A tab formed in the mounting clip engages the plastic shield after closing the hood to prevent withdrawal of the shield after closing the hood.

14 Claims, 1 Drawing Sheet

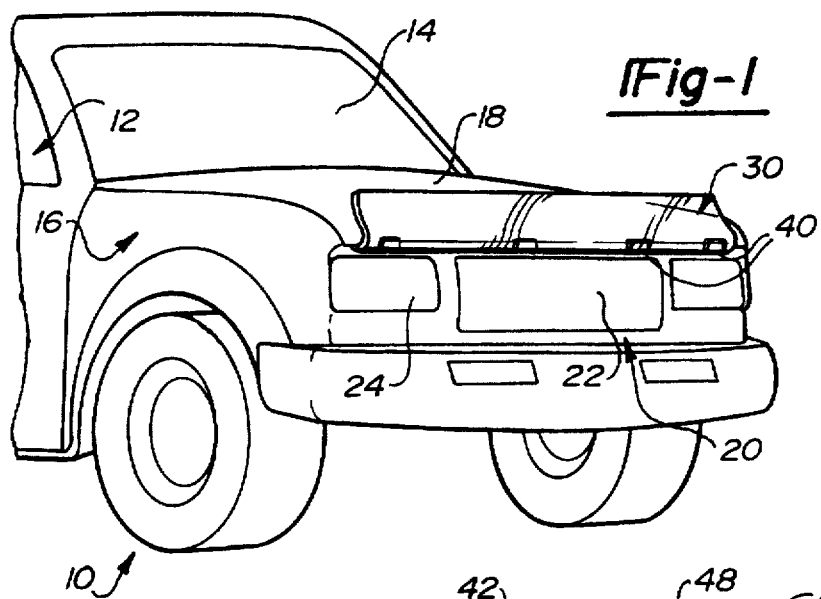
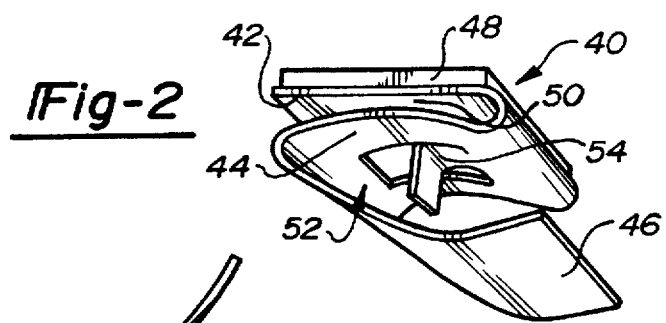
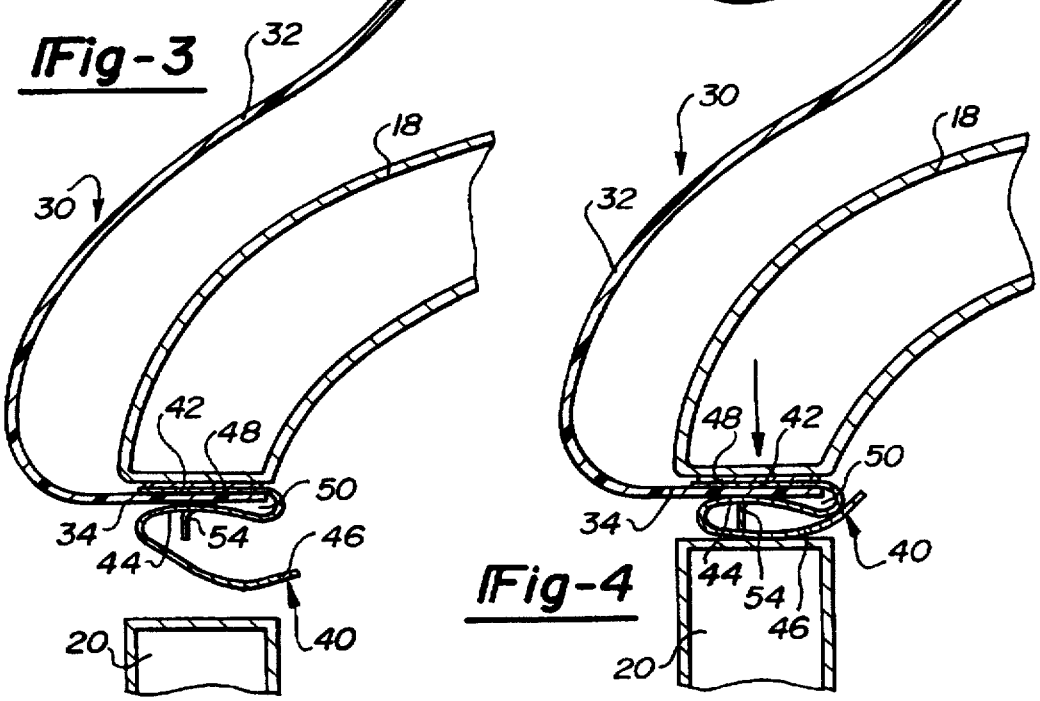

VEHICLE DEFLECTOR MOUNTING SYSTEM

BACKGROUND OF THE INVENTION

1. Field of the Invention

This invention relates to air deflector or bug shields for the front hood of a vehicle, and in particular, to a system for mounting the shield to the front hood without drilling or fasteners inserted through the hood.

2. Description of the Prior Art

Front deflectors for vehicles have become increasingly popular for aesthetic as well as functional needs of the vehicle owner. As the vehicle travels along the road, airflow which would normally move across the vehicle hood and windshield is deflected up and over the passenger compartment. The deflected airflow carries with it the insects and other debris which would normally impact the front hood and windshield. In addition to preventing damage to the vehicle body, the unappealing mess of splattered insects is also reduced.

Previously known deflectors were securely fastened to the body of the vehicle using a plurality of machine screws or bolts. The typical vehicle did not include apertures for receiving such fasteners and therefore holes had to be drilled to insert the fastener. In addition to being a burden to the vehicle owner, such invasive mounting reduced the integrity of the body panel to which the shield is mounted, typically the front hood, and creating unfinished metal edges at which corrosion can form. This corrosion or rust can be a particular problem at the front hood which is subject to road salts and moisture. Additionally, the front deflectors which are fastened to the hood are not readily removable without disassembly.

SUMMARY OF THE PRESENT INVENTION

The present invention overcomes the disadvantages of the prior known vehicle deflectors by providing a front deflector which is removably mounted to the vehicle hood in a noninvasive manner not requiring drilling of the vehicle body or fasteners.

The vehicle deflector of the present invention includes a deflector body having a curved shield portion and a mounting flange portion. The length of the deflector is designed to extend across the hood of the vehicle thereby deflecting a substantial portion of the airflow. Once mounted to the vehicle hood, the shield portion extends over the front of the hood and the flange portion extends between the hood edge and the front grille of the vehicle. In this manner, the deflector is connected to the hood and will travel with the hood upon opening.

The vehicle deflector is secured to the hood in a nonintrusive manner to eliminate drilling of the vehicle. The deflector body is attached to the hood by a plurality of attachment clips spaced along the flange portion of the deflector. The clips have a substantially S-shaped configuration forming an upper slot for receiving the flange portion of the deflector body. An adhesive pad is applied to a flat upper surface of the clip for adhering the clip, and therefore the deflector, to a front edge of the vehicle hood. In addition to securing the clip to the vehicle hood, the adhesive pad prevents contact between the metal clip and the painted finish of the hood. A lower end of the clip acts as biasing means to prevent rattle of the deflector assembly between the hood and front grille of the vehicle. The center leg of the S-shaped clip includes a locking tab formed from the body of the clip and frictionally engaging the deflector flange to retard removal of the deflector body from the clips. The locking tab is engaged by the lower biasing means of the clip upon closing the hood thereby increasing the force of the locking tab against the deflector flange. This increased pressure is intended to prevent removal of the shield once the hood has been closed.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawings, in which like reference characters refer to the parts throughout the views and in which:

FIG. 1 is a perspective view of a vehicle having a deflector assembly mounted thereto;

FIG. 2 is a perspective view of a spring clip for attachment of the deflector to the vehicle;

FIG. 3 is a cross-sectional view of the deflector assembly mounted to a vehicle hood in a partially open position; and FIG. 4 is a cross-sectional view of the deflector assembly mounted to a vehicle hood in a closed position.

DETAILED DESCRIPTION OF A PREFERRED EMBODIMENT OF THE PRESENT INVENTION

Referring first to FIG. 1, there is shown a vehicle 10 comprising a passenger compartment 12 with a windshield 14 and a front compartment 16 typically housing the vehicle engine (not shown). The engine compartment 16 is accessed through a hinged hood 18 and includes a fixed front portion 20 with a grille 22, operating lights 24 and the like. As the vehicle 10 travels across the road, airflow moves over the front hood 18 and against the windshield 14 before moving over the passenger compartment 12. Along with the airflow, insects and road debris can be carried over the hood 18 before engaging the windshield 14. In order to deflect this airflow upwardly over the hood 18 and passenger compartment 12, front air deflectors 30 can be installed at the front of the vehicle 10. The deflectors 30 are designed to deflect any debris up over the vehicle 10 along with the airflow thereby protecting the hood 18 and windshield 14.

Referring now to FIGS. 2 through 4, there is shown the deflector 30 mounted to the front end of the vehicle. In the typical installation, the deflector 30 is attached to the hinged hood 18 in order to travel with the hood 18 when opened. In the prior known deflector assemblies, apertures need to be drilled in the underside of the hood to accommodate fasteners such as bolts or screws. The present invention eliminates such invasive mounting systems by providing a plurality of mounting clips 40 as best shown in FIG. 2. The deflector 30 is preferably constructed of a molded or extruded plastic. The deflector body 30 comprises a shield portion 32 and a flange portion 34 and extends substantially the full width of the hood 18. Upon mounting the deflector 30, the shield portion 32 is positioned out in front of the hood 18 to deflect air flow while the integral flange 34 extends beneath the front hood 18.

The mounting clips 40 are attached to the mounting flange 34 spaced transversely along the length of the flange 34. The clip 40 has a substantially S-shaped configuration and is preferably made of metal to provide resilient biasing as required. The S-shaped clip 40 has an upper leg 42, an intermediate leg 44 and a lower leg 46 integrally formed to create the S configuration. The upper leg 42 is substantially planar to create a flat attachment surface having an adhesive pad 48 mounted thereto. The adhesive pad 48 is in the form of a two-sided tape adhering to the upper leg 42 of the clip 40. Upon removal of a liner, the exposed side of the adhesive pad 48 will adhere to a flat surface of the front hood 18 substantially as shown in FIGS. 3 and 4.

The upper leg 42 and intermediate leg 44 are formed in close proximity during bending of the clip 40 forming a slot 50 therebetween. The slot 50 of the clip 40 is adapted to receive the mounting flange 34 of the deflector 30. While the upper leg 42 and intermediate leg 44 can be formed in sufficient proximity to create the frictional engagement with the mounting flange 34 to retard separation of the clip 40 from the deflector 30, secondary engagement means 52 is preferably formed in the intermediate leg 44 to securely engage the mounting flange 34 within the slot 50. In a preferred embodiment, the engagement means 52 is a locking tab 54 formed out of the intermediate leg 44. The tab 54 is configured to bend into the slot 50 thereby engaging the mounting flange 34 of the deflector 30. The free end of the tab 54 is preferably bent downwardly to extend into a slot between the intermediate leg 44 and the lower leg 46 of the clip 40. The lower leg 46 is formed at a larger radius to the intermediate leg 44 than the upper leg 42 to form resilient biasing means against the fixed front portion 20 of the vehicle 10 when the hood 18 is closed, as will be subsequently described.

Prior to installation, a plurality of the mounting clips 40 are secured to the deflector 30 by inserting the mounting flange 34 within the slot 50 between upper and intermediate legs 42,44 of the clip 40. The tab 54, which protrudes into the slot 50, will be pushed downwardly allowing complete insertion. However, the biasing properties of the metal tab 54 will act against the deflector flange 34 increasing the frictional retainment. A sufficient number of mounting clips 40 are applied to the deflector 30 to ensure secure mounting to the hood 18. Additionally, the clips 40 should be spaced to adhere to relatively flat mounting surfaces in the hood 18. The frictional engagement of the clip 40 allows longitudinal adjustment to ensure mounting to a favorable surface. Once the clips 40 are attached to the deflector 30, the liner for the adhesive 48 can be removed and the clips 40 mounted to the hood 18 substantially as shown in FIGS. 3 and 4.

The structure of the clip 40 provides added retaining strength and rattle prevention when positioned between the hood 18 and the front grille portion 20. As the hood 18 is closed, the lower leg 46 will be engaged by the front portion 20 and compressed towards the remainder of the clip 40. The biasing of the lower leg 46 ensures a certain amount of tension between the hood 18, clip 40, and front portion 20 eliminating any play therebetween which could cause rattling. In addition, as the clip 40 is compressed, the lower leg 46 will engage the free end of the tab 54 pressing the tab 54 upwardly into stronger engagement with the mounting flange 34 of the deflector 30. Accordingly, the clip 40 ensures a secure yet adjustable retainment of the deflector shield 30 to the hood 18 of a vehicle 10.

The foregoing detailed description has been given for clearness of understanding only and no unnecessary limitations should be understood therefrom as some modifications will be obvious to those skilled in the art without departing from the scope and spirit of the appended claims.

What is claimed is:

1. An airflow deflector assembly adapted to be attached to a motor vehicle for airflow thereover, said deflector assembly comprising:

a deflector having a shield portion deflecting the airflow and a flange portion; and at least one mounting clip removably attached to said flange portion of said deflector, said at least one mounting clip including means for adhesively mounting said deflector assembly to a hood of the vehicle, means for frictionally engaging said flange portion of said deflector to retard separation of said at least one clip from said deflector, and biasing means integrally formed with said at least one mounting clip, said biasing means compressing against said flange portion of said deflector;

said means for adhesively mounting said deflector assembly to a surface of the hood such that said at least one clip is compressed between the hood and a fixed portion of the vehicle upon closing the hood, said biasing means engaging the fixed portion of the vehicle upon said closing and compressing against said flange portion of said deflector.

2. The deflector assembly as defined in claim 1 wherein said biasing means resiliently biases said at least one mounting clip between the hood and the fixed portion of the vehicle to eliminate movement therebetween upon said closing the hood.

3. The deflector assembly as defined in claim 1 wherein said at least one mounting clip has a substantially S-shaped configuration with integral upper leg, intermediate leg, and lower leg.

4. The deflector assembly as defined in claim 3 wherein said upper leg of said at least one clip is substantially planar, said mounting means being seated on said planar upper leg.

5. The deflector assembly as defined in claim 3 wherein said upper leg is disposed proximate said intermediate leg forming a slot therebetween, said flange portion of said deflector being received within said slot such that said upper and intermediate legs frictionally engage said flange portion.

6. The deflector assembly as defined in claim 5 wherein said means for frictionally engaging said flange portion comprises a locking tab extending from said intermediate leg into said slot to selectively engage said flange portion of said deflector.

7. The deflector assembly as defined in claim 6 wherein said locking tab includes a depending end extending from said intermediate leg of said at least one mounting clip.

8. The deflector assembly as defined in claim 7 wherein said biasing means comprises said lower leg of said at least one mounting clip, said lower leg being compressed upon said closing of the vehicle hood into engagement with said end of said locking tab thereby biasing said locking tab into engagement with said flange portion of said deflector.

9. An airflow deflector assembly adapted to be attached to a front hood of a motor vehicle for airflow thereover, said deflector assembly comprising:

a deflector having a shield portion deflecting the airflow and a flange portion; and a plurality of mounting clips removably attached to said flange portion of said deflector, each said mounting clips having a substantially S-shaped configuration with an upper leg disposed proximate an intermediate leg forming a slot therebetween for receiving said flange portion of said deflector and a lower leg forming resilient biasing means on each said mounting clips.

10. The deflector assembly as defined in claim 9 and further comprising a locking tab formed in said intermediate leg of each said mounting clips, said locking tab extending at least partially into said slot between said upper and intermediate legs of each said mounting clips to lockingly engage said flange portion upon attachment of said mounting clips to said deflector.

11. The deflector assembly as defined in claim 10 wherein said locking tab of each said mounting clip includes a depending end selectively engageable by said lower leg forming said resilient biasing means of each said mounting clips.

12. The deflector assembly as defined in claim 11 wherein each said mounting clip includes means for adhesively mounting said deflector assembly to the vehicle hood such that said clips are selectively compressible between the hood and a fixed portion of the vehicle upon closing of the hood, said mounting means being disposed on said upper leg of each said mounting clip.

13. The deflector assembly as defined in claim 12 wherein said resilient biasing means forming said lower leg of each said mounting clip is compressed upon said closing the vehicle hood into engagement with said end of said locking tab biasing said locking tab into engagement with said flange portion of said deflector.

14. In an assembly for deflecting airflow over a front hood of a motor vehicle, said assembly being attached to the front hood for movement with the hood during opening and closing of the vehicle hood, the improvement comprising:

a plurality of mounting clips for attaching said deflector assembly to the vehicle hood, each said mounting clips having a substantially S-shaped configuration with an upper leg disposed proximate an intermediate leg forming a slot therebetween for receiving said deflector, a locking tab formed in said intermediate leg and at least partially extending into said slot to frictionally engage said deflector, and a lower leg resiliently compressible upon closing of the vehicle hood to bias said locking tab into engagement with said deflector, said mounting clips including adhesive means for mounting said clips and said deflector assembly to the vehicle hood.

* * * * *